O. EBERT.
REAMER.
APPLICATION FILED MAR. 14, 1918.
1,273,752.
Patented July 23, 1918.
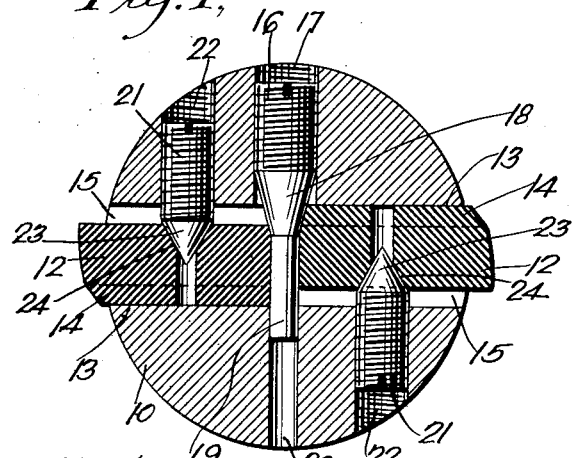
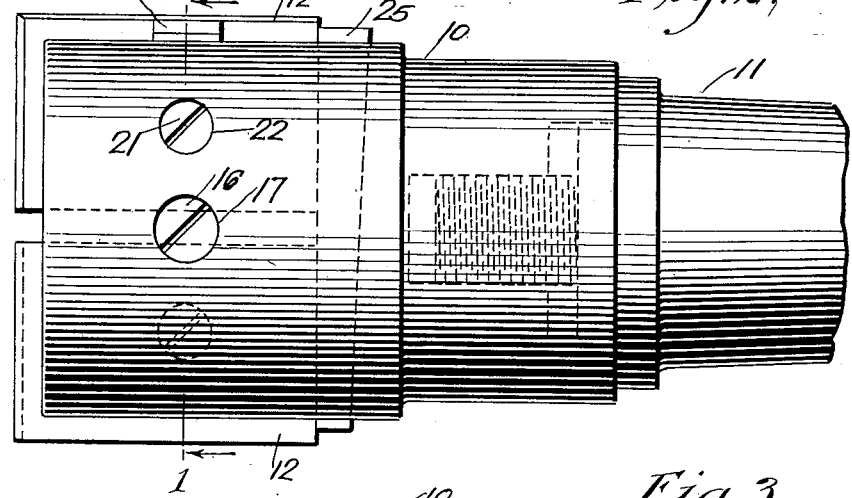
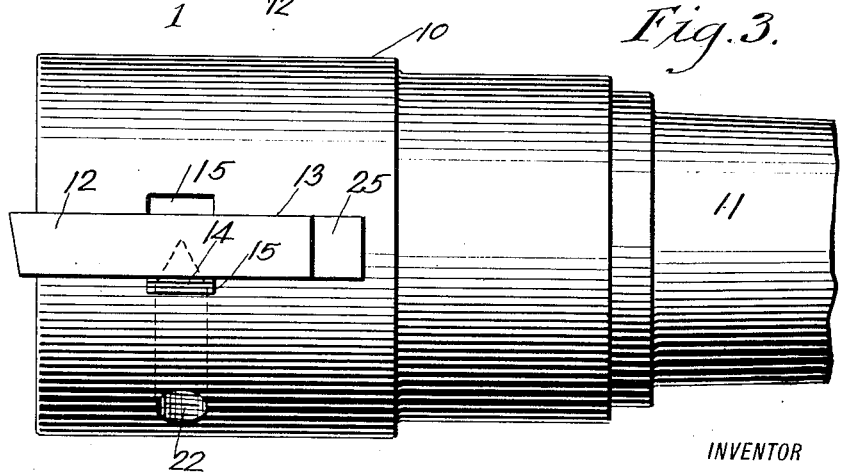
WITNESSES
Edw. Thorpe
J. L. McAuliffe
INVENTOR
Otto Ebert
BY Munn & Co.
ATTORNEYS

UNITED STATES PATENT OFFICE.

OTTO EBERT, OF CLEVELAND, OHIO.

REAMER.

1,273,752.  Specification of Letters Patent.  Patented July 23, 1918.

Application filed March 14, 1918. Serial No. 222,332.

*To all whom it may concern:*

Be it known that I, OTTO EBERT, a citizen of the United States, and a resident of Cleveland, in the county of Cuyahoga and State of Ohio, have invented a new and Improved Reamer, of which the following is a full, clear, and exact description.

The prime object of my invention is to provide improved means to adjustably secure the cutters in the head of the tool.

Other objects of the invention and their advantages will appear as the description proceeds.

Reference is to be had to the accompanying drawings forming a part of this specification in which similar reference characters indicate corresponding parts in all the views, it being understood that the drawings are merely illustrative of one example of the invention.

Figure 1 is a cross section on the line 1—1, Fig. 2;

Fig. 2 is a side elevation of a reamer embodying my invention;

Fig. 3 is a similar view taken at right angles to Fig. 2.

In carrying out my invention a suitable tool head 10 is provided, formed upon or secured in any approved way to a shank 11. In the head 10 I produce diametrically opposite slots 13 which slidably receive cutters 12, the slots meeting at the center and constituting in effect a single through slot. At the sides of the slots complementary grooves 15 are formed which receive a guide rib 14 on the back of each cutter 12, the ribs 14 thus being at opposite sides of the respective cutters.

An adjusting screw 16 is received in a threaded hole 17 formed in the head 10 transversely to the plane of the cutters 12 and intersecting said plane at the center. The screw has a conical head 18 adapted to be entered to a greater or less extent between the opposed side edges of the cutters 12 to thereby project the outer ends thereof to a greater or less extent as desired. Advantageously, also in practice I form on the adjusting screw 16 at the front of the cone 18 a pilot pin 19 coaxial with the screw, the forward end of the pilot pin being received in a guide hole 20 coaxial with the screw hole 17. The hole 20 is shown extending entirely through the opposite side of the head 10 from the hole 17 merely as a convenient manner of producing said hole 20. Fastening screws 21 are employed additional to the adjusting screw 16 and adapted to bind against the respective cutters 12, said screws 21 being received in threaded holes 22 in the head. The front ends 23 of the screws 21 are tapered as shown, the cutters having correspondingly tapered depressions 24 therein.

It will thus be seen that the taper of the screw 16 at 18, when said screw is advanced, will serve to simultaneously move the cutters 12 outwardly and, conversely, retraction of the screw 16 will permit the cutters 12 to be moved toward each other, it being understood that in the adjustment of the screw 16, the fastening screws 21 will be turned back sufficiently to allow clearance for the adjusting movement of the cutters with respect to the tapered points 23 of said screws 21. After the cutters have been given a desired adjustment and seated firmly against the conical surface 18, the fastening screws 21 are advanced to a firm bearing against the respective cutters. Thus, in the final position of the cutters the screws 21 may or may not be coaxial with the depressions 24, since it will suffice for the conical ends 23 to bear against the respective cutters 12 at those sides of the depressions 24 toward the screws 16. In addition to the screws 16 and 21, I prefer to employ a wedge 25 at the top or back edge of the cutters 12 in the rear end of the slot 13.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claim.

Having thus described my invention, I claim as new, and desire to secure by Letters Patent:

A tool of the class described including a head formed with a transverse slot, there being grooves in said head at opposite sides of the center complementary to the slot, the respective grooves being at opposite sides of the slot, cutters slidable transversely in said slot and formed with ribs on the backs thereof fitting said grooves, an adjusting screw transversely disposed in the head having a wedging portion engageable with the opposed edges of the cutters, and fastening screws in the head at the sides of the adjusting screw and at the opposite sides of the cutters from the said ribs, the forward ends of the fastening screws being conical, and the cutters having corresponding depressions to accommodate the coned ends in any given adjustment of the cutters and the adjusting screw.

OTTO EBERT.